United States Patent
Aoki et al.

(10) Patent No.: US 6,788,951 B2
(45) Date of Patent: Sep. 7, 2004

(54) RADIO COMMUNICATION SYSTEM USING VARIABLE PACKET LENGTH

(75) Inventors: Yutaka Aoki, Nisshin (JP); Minoru Okada, Nagoya (JP)

(73) Assignee: Denso Corporation, Kariya (JP)

(*) Notice: Subject to any disclaimer, the term of this patent is extended or adjusted under 35 U.S.C. 154(b) by 610 days.

(21) Appl. No.: 09/840,988

(22) Filed: Apr. 25, 2001

(65) Prior Publication Data

US 2001/0044315 A1 Nov. 22, 2001

(30) Foreign Application Priority Data

May 22, 2000 (JP) ........................................ 2000-149893

(51) Int. Cl.[7] .............................................. H04Q 7/20
(52) U.S. Cl. ........................ 455/524; 455/441; 455/525; 340/936
(58) Field of Search ................................. 455/524, 441, 455/525, 452, 11.1, 422, 436, 456, 70, 352; 340/936, 910, 931

(56) References Cited

U.S. PATENT DOCUMENTS

| | | | | |
|---|---|---|---|---|
| 6,012,012 A | * | 1/2000 | Fleck et al. | 701/117 |
| 6,026,277 A | * | 2/2000 | Gavrilovich | 455/11.1 |
| 6,484,032 B1 | * | 11/2002 | Okada | 455/456.1 |
| 2001/0029425 A1 | * | 10/2001 | Myr | 701/200 |
| 2002/0004371 A1 | * | 1/2002 | Montgolfier | 455/70 |
| 2003/0052797 A1 | * | 3/2003 | Rock et al. | 340/936 |

FOREIGN PATENT DOCUMENTS

| | | |
|---|---|---|
| EP | 903951 | 3/1999 |
| EP | 1059737 | 12/2000 |
| JP | A-5-260000 | 10/1993 |

* cited by examiner

*Primary Examiner*—Nick Corsaro
*Assistant Examiner*—Tan Trinh
(74) *Attorney, Agent, or Firm*—Posz & Bethards, PLC

(57) ABSTRACT

A radio communication system performs radio communication between a terminal station installed on a vehicle and a plurality of base stations provided along a roadside. The system detects a vehicle traveling speed in each communication area formed by each base station. The vehicle traveling speed is detected by a method which uses radio communication between the terminal station and the base stations. The time of the vehicle stay in the communication area is estimated based on the detected vehicle traveling speed, and the length of a packet is determined based on the estimated time of the vehicle stay in the communication area. In this way, the present system performs data transmission using a packet of an appropriate length according to the detected vehicle traveling speed.

9 Claims, 10 Drawing Sheets

FIG. 3A
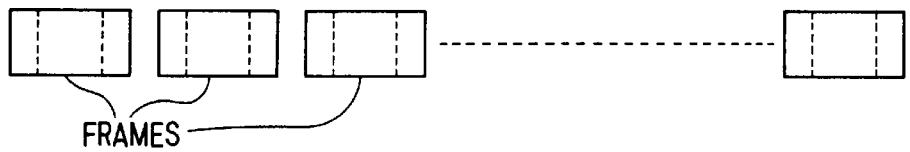
FIG. 3B
FIG. 3C
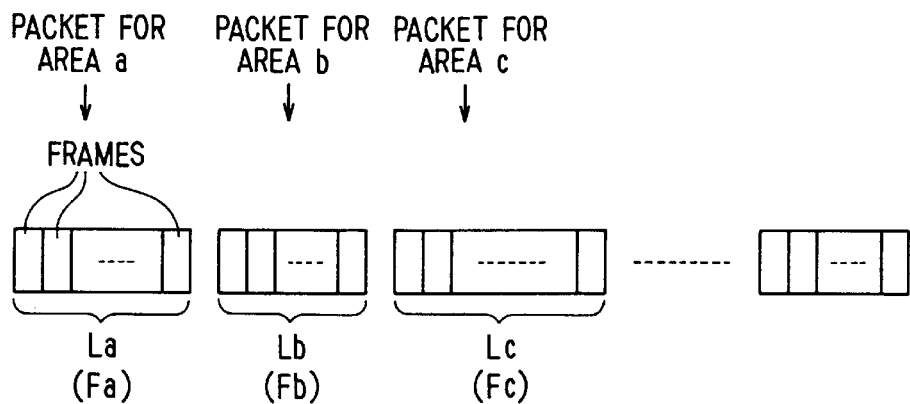
FIG. 3D

CONTROL SIGNAL

RADIO COMMUNICATION SYSTEM USING VARIABLE PACKET LENGTH

CROSS REFERENCE TO RELATED APPLICATION

This application is based on and incorporates herein by reference Japanese Patent Application No. 2000-149893 filed on May 22, 2000.

BACKGROUND OF THE INVENTION

1. Field of the Invention

The present invention relates to a radio communication system capable of data transmission between a mobile terminal station installed on a mobile object (e.g., a vehicle) and fixed base stations fixedly provided along a traveling route (e.g., a roadside) of the mobile object.

2. Related Art

As a radio communication technique in the field of mobile communication, a cellular communication system such as a PDC (Personal Digital Cellular) system have already been realized. In PDC system, the communication service area is divided into a number of macro cells, and a fixed radio base station is installed in the center of each cell. To realize a continuous type communication, each cell must be overlapped with adjacent cells. Thus the carrier frequency of each cell must be different from those of the adjacent cells to prevent interference. Accordingly the whole frequency range allocated to the service (PDC system) should be divided and allocated to each cell. In this case, the frequency band to be used by each user becomes narrow in comparison with the whole band, and as a result the possible rate of data transmission is limited. Further, a plurality of user mobile terminals exist in each cell, if the cell is defined relatively large. Accordingly multiple access should be allowed in each cell. For example, time division multiple access (TDMA), frequency division multiple access (FDMA), or code division multiple access (CDMA) is adopted for allocating the time for access to each user, and thereby the average rate of data transmission is further lowered.

Thus, when a cellular communication system is used for communication between a vehicle and a roadside, the communication resources (time, frequency or code) allocated to each user is insufficient for broadband communication. Therefore it is difficult to implement broadband communication by the cellular communication system. Japanese patent application No. 2000-72387 (U.S. patent application Ser. No. 09/804,475 filed on Mar. 13, 2001) proposes a novel communication system which is effective for implementing broadband communication. It also proposes a technique for providing an improved data transmission rate in comparison with cellular communication system and allowing to reduce the number of base stations. In this technique, data is divided and transmitted in a plurality of communication areas formed by a plurality of base stations installed along a traveling route of a vehicle if data transmission cannot be completed in one communication area formed by one base station.

In the case that data is thus divided and transmitted in a plurality of communication areas, traveling speed of a vehicle on which a terminal station is installed should be considered for efficient data transmission. The vehicle traveling speed or the time of the vehicle stay in a communication area greatly depends on a degree of traffic congestion. Therefore, if the length of a packet is fixed based on the time of the vehicle stay in a communication area in case of traffic congestion of a specific degree, it is too long or too short when the actual degree of traffic congestion is different from the specific degree. That is, transmission of a packet is completed too soon and time is left uselessly (the fixed length of a packet is too short) if the actual time of the vehicle stay in a communication area is longer than the assumed time, but transmission of a packet cannot be completed (the fixed length of a packet is too long) if the actual time of the vehicle stay in a communication area is shorter than the assumed time. Further, the time of the vehicle stay in a communication area also depends on a traveling speed of the vehicle. If the length of a packet is fixed, it should be fixed based on the time of the vehicle stay in a communication area in the case that the vehicle travels at the possible highest speed. However, it is too short in the case that the vehicle travels at a lower speed than the possible highest speed.

The above problem arises not only in the radio communication system wherein a spot access method, which forms communication areas not to overlap each other, is employed similarly as proposed. It may also arise in the communication system wherein communication areas are formed to overlap each other, if data transmission involving data division is performed in the communication system. Further, the above problem arises not only in the case that data is transmitted from base stations to a terminal station. It may also arise in the case that data is transmitted from a terminal station to base stations, if the data transmission involves data division.

Therefore, the length of a packet should be adjusted according to the time of the vehicle stay in the communication area. For that purpose, the traveling speed of the vehicle needs to be detected. This may be obtained from information provided by a vehicle speed sensor or by using GPS. More accurate detection method, if any, is more desirable in the case that the communication areas are relatively narrow (that is, the time of the vehicle stay in the communication area is relatively short). Furthermore, it is desirable to detect the vehicle traveling speed by utilizing the radio communication system which provides communication between a terminal station and base stations, since it is not required to prepare a special structure for detecting the traveling speed.

SUMMARY OF THE INVENTION

The present invention has an object to provide a radio communication system which performs radio communication between a mobile terminal station and fixed base stations using a packet of an appropriate length according to the time of the terminal station stay in each communication area formed by each base station.

The radio communication system according to the present invention performs radio communication between a terminal station installed on a mobile object and a plurality of base stations provided along a traveling route of the mobile object. If the data transmission between the base station and the terminal station cannot be completed in one communication area formed by the base station, data is divided and transmitted in a plurality of communication areas corresponding to base stations arranged in a traveling direction of the mobile object. When the data transmission involving data division is performed in this way, the present system detects the traveling speed of the mobile object in each communication area and estimates the time of the mobile object stay in the communication area based on the detected traveling speed of the mobile object.

The length of a packet is determined based on the estimated time of the mobile object stay in the communication area so that transmission of the packet can be completed during the mobile object stay in the communication area and is not completed too soon. The length of the packet is adjusted to the determined length by varying the number of frames included in the packet or varying the length of a frame. In this way, the present system performs data transmission using a packet of an appropriate length according to the detected mobile object traveling speed.

The present invention also provides several methods for detecting the traveling speed of a mobile object accurately by utilizing the present radio communication system.

BRIEF DESCRIPTION OF THE DRAWINGS

The above and other objects, features and advantages of the present invention will become more apparent from the following detailed description made with reference to the accompanying drawings. In the drawings:

FIGS. 3A–3C are schematic diagrams showing frames which constitute a packet;

FIG. 3D is a schematic diagram showing packets formed for each communication area;

DETAILED DESCRIPTION OF THE PREFERRED EMBODIMENT

Figure 1A:
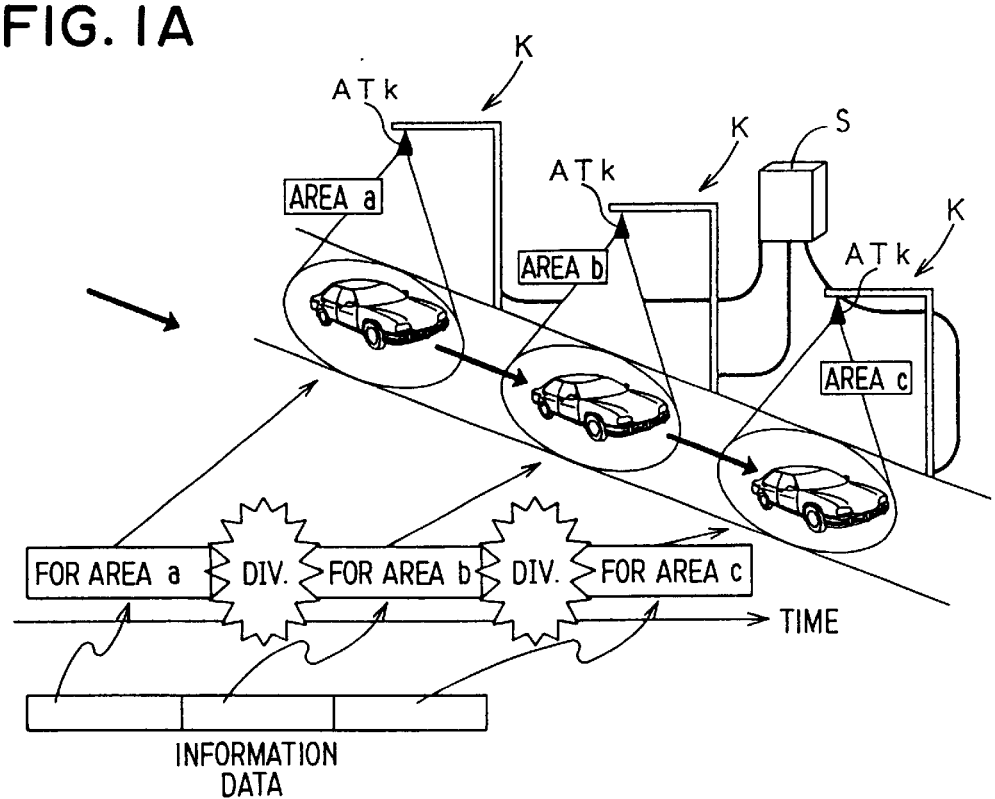
FIG. 1A is a schematic diagram showing a communication system between a vehicle and a roadside according to an embodiment of the invention.
Figure 1B:
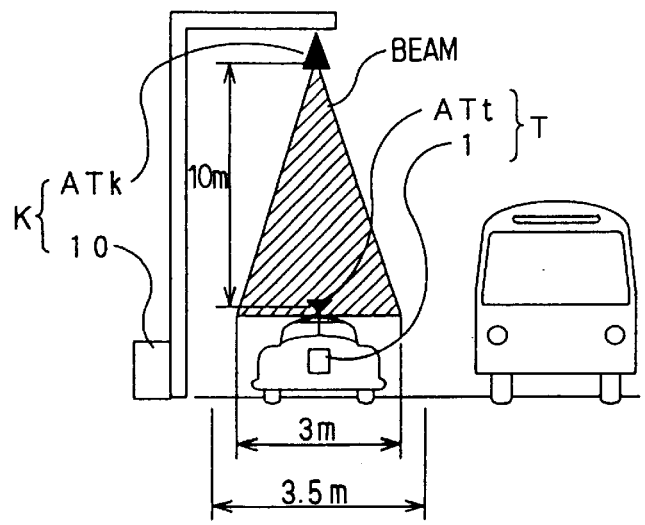
FIG. 1B is a schematic diagram showing a communication area formed by each base station in the embodiment.

Referring first to FIGS. 1A and 1B, a communication system comprises a plurality of base stations K fixedly arranged with predetermined separation distance along a road and mobile terminal stations T installed on vehicles running on the road.

Each terminal station T comprises an antenna (terminal station antenna) ATt installed on the upper part of a vehicle and a terminal station device 1 for performing radio communication via the terminal station antenna ATt.

Each base station K comprises an antenna (base station antenna) ATk provided above the road and a base station device 10 for performing radio communication through the base station antenna ATk. The base station devices 10 are connected to a control station S through optical fibers.

Each base station K forms a predetermined communication area by emitting a carrier wave beam for performing radio communication with the terminal station T installed on the vehicle traveling through the communication area. Each terminal station T on the vehicle travels through communication areas intermittently as the vehicle travels on the road. While the vehicle travels through a communication area, it performs data communication with the base station K which forms the communication area. Here, the communication areas formed by the base stations K are established so that each communication area satisfies the following two conditions.

(i) The communication area is sized not to include a plurality of vehicles (terminal stations T) simultaneously. Specifically, it is an area (personal area) which can includes at most one vehicle carrying the terminal station T.

(ii) The communication area is configured not to overlap with adjacent communication areas.

The communication method which performs communication between the terminal station T and the base stations K in the communication areas formed to satisfy the above two conditions is defined as a spot access method. The spot access method provides the following effects.

First, the whole band and all the communication time allocated to one communication area can be allocated exclusively to one terminal station T due to the above condition (i). Consequently, multiple access such as time division or frequency division etc. need not be employed in the communication area. Thus broadband communication is possible. Moreover, all the communication areas can use the same frequency band. Accordingly each communication area can use the whole frequency band allocated to the service. Thus broadband communication is possible.

The size and shape of the communication area which satisfies the condition (i) will be explained in further detail. Vehicles which use this communication system includes vehicles of various sizes, from a large-sized truck to a medium-sized or small-sized vehicle. However, when the size of the communication area satisfies the condition (i) with respect to a small-sized vehicle, it also satisfies the condition (i) with respect to a larger vehicle. Therefore, the size of the communication area should be examined with respect to a small-sized vehicle. Since the actual length of a vehicle in its traveling direction is about 4 meters, the length of the communication area in the vehicle traveling direction should be set to about 4 meters for satisfying the condition (i). If the length of communication area in the vehicle traveling direction is set to about 4 meters, the condition (i) is satisfied in any degree of traffic congestion. On the other hand, the actual width of a vehicle is about 2 meters. Since the vehicle does not always run on the middle of a traffic lane, the width of communication area should be set to about 3.5 meters, i.e. the width of a traffic lane. However, if the width of the communication area is 3.5 meters, carrier waves for forming the communication area covering a traffic lane may be scattered over the next traffic lane and thereby interference occurs. Therefore, it is desirable to leave margins of 10% of the lane on both sides of the lane. Accordingly the width of the communication area should be set to about 3 meters.

In this way, the communication area is determined to be 4 meters long and 3 meters wide. This size means, as shown in FIG. 1B, the size of the communication area at the height of the terminal station antenna ATt installed on the upper part of the vehicle. Since the actual heights of the vehicle is between 1.4 meters and 1.5 meters, the communication area is formed so as to have the above size at a height between 1.4 meters and 1.5 meters on the road.

The above size of the communication area may be modified according to circumstances. If there exists a median strip or the like between adjacent traffic lanes, it is not necessary to leave margins on both sides of the lane, that is, the width of the communication area may be set to 3.5 meters. Furthermore, in the case that the communication areas are formed so as not to be aligned widthwise each other, the width of the communication area may be set to 3.5 meters since carrier waves scattered from the communication area have little effect on the adjacent communication areas.

The shape (cross-sectional shape) of the communication area shown in FIG. 1B is nearly oval, and a communication area of this shape can be easily formed. However, a nearly rectangular communication area is more desirable, because the time of the vehicle stay in the communication area is the same regardless of the vehicle traveling position on a traffic lane.

Next the desirable carrier frequency for forming the communication area will be explained. The directivity of the carrier wave beam becomes higher as the carrier frequency becomes higher. Therefore, the higher the carrier frequency is, the more desirable it is in terms of the directivity of the carrier wave beam. Furthermore, if micro waves, which have a lower frequency than millimeter waves, are employed as the carrier waves, they may be diffracted and scattered by the surface of a road or a vehicle and thereby interference may occur when the communication areas are formed not to overlap each other. Therefore it is desirable to employ millimeter waves as the carrier waves, since the millimeter waves have a sufficiently high directivity and are attenuated sufficiently in the air.

Next the desirable position of the base station antennas ATk via which the carrier waves for forming the communication area are emitted will be explained. Since the millimeter waves used as carrier waves have a tendency to propagate very rectilinearly, they are often obstructed (shadowed) by a large-sized vehicle running on the adjacent traffic lane or sign posts. Therefore, the base station antennas ATk are desirable to be positioned along the width of a road so that they emit a carrier wave beam straight down toward the terminal station antenna ATt installed on the upper part of the vehicle as shown in FIG. 1B.

Figure 2A:
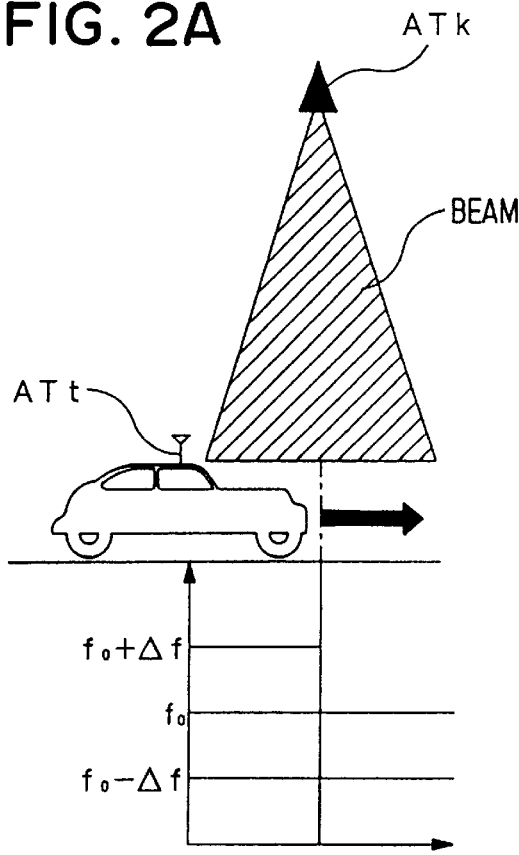
FIGS. 2A and 2B are schematic diagrams showing the position of an antenna in a vehicle traveling direction in each communication area.
Figure 2B:
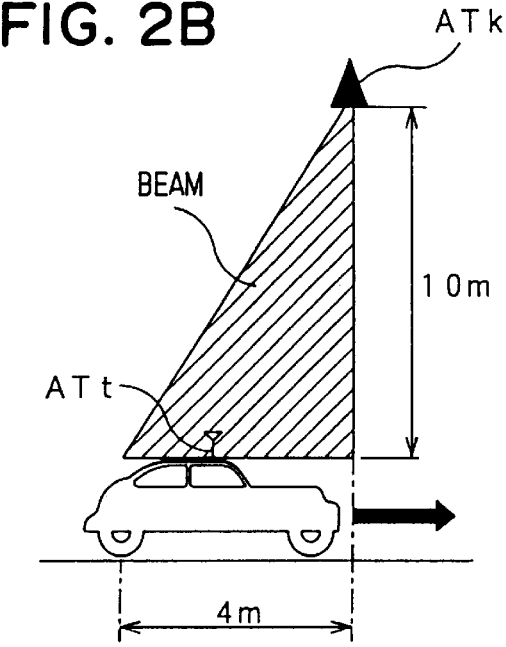

Next the position of the base station antennas Atk in the vehicle traveling direction will be explained. If the base station antenna ATk emits a carrier wave beam so that the communication area is formed symmetrically in the vehicle traveling direction with respect to the antenna ATk, the carrier frequency varies discontinuously (f0+Δf→f0−Δf) due to the Doppler effect just when the terminal station antenna ATt passes directly below the base station antenna ATk as shown in FIG. 2A.

Therefore, in the present embodiment, the base station antenna ATk emits a carrier wave beam backward so that the communication area is formed in the opposite direction to the vehicle traveling direction. However, the base station antenna ATk may emit a carrier wave beam forward so that the communication area is formed in the vehicle traveling direction. The height of the base station antenna position is set to 10 meters, however, this may be modified according to circumstances.

Figure 2C:
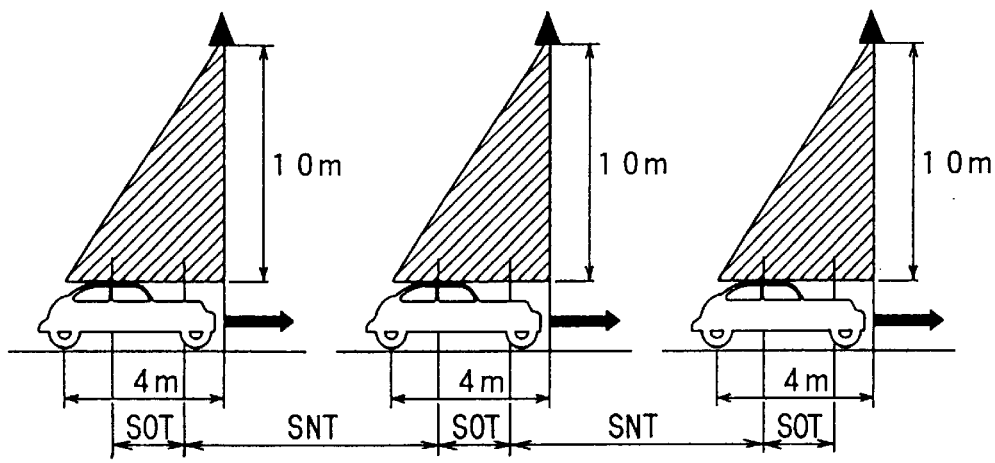
FIG. 2C is a schematic diagram showing section on transmitting (SOT) and section not transmitting (SNT) formed by a spot access method.

By setting the distance between the communication areas as follows, the present system which employs a spot access method can implement broadband communication in comparison with a continuous access method such as a cellular communication system. The spot access method can transmit data in each communication area at fifty times as high speed as the continuous access method can, but it involves Sections not transmitting (SNT) which are not found in the continuous access method, as shown in FIG. 2C. The SNT are areas in which communication is impossible. Therefore, the spot access method can perform communication at higher speed than the continuous access method can, if the distance between the communication areas is set to be sufficiently short. However, the infrastructure cost increases if the base stations K are installed with a short separation distance from the adjacent base stations. In view of this trade-off, it is proposed the ratio of the length of the SNT to the length of the Section on transmitting (SOT) is varied diversely, and the average data transmission rates are calculated for the various ratios. In this calculation, the time available for transmission is assumed to be 50 percent of the time of the terminal station antenna stay in the communication area in consideration of the time required for controlling (turning on or off) circuits in the system. As a result of the calculation, it is concluded that the desirable distance between the communication areas is between 10 meters and 20 meters, and the desirable distance between the base station antenna ATk and the terminal station antenna ATt is about 10 meters.

In the communication by the spot access method, data transmission is sometimes not completed in one communication area if data to be transmitted is too large. In this case, the data should be divided and transmitted in a plurality of communication areas formed by a plurality of base stations K as shown in FIG. 1A.

When large data is downloaded from base stations K to the terminal station T, the data is divided and packetized in the control station S first. For example, the data is divided and packetized into three parts for three communication areas a, b, c, and transmitted to the three base stations K of the communication areas a, b, c as shown in FIG. 1A. Each of three base stations K starts to transmit the received packet when the terminal station T enters the corresponding communication area. In this way, the terminal station T receives the three packets sequentially as the vehicle passes through the communication areas a, b, c. The terminal station T extracts the packets received from the three base stations K by demodulation. The terminal station T further converts the extracted packets to parts of data in the original form and restores the original data by combining the parts of data. The restored data may be used for an application executed on the terminal station T. On the other hand, when large data is uploaded from the terminal station T to base stations K, the terminal station T divides the data into a plurality of packets for a plurality of communication areas, and the packets are sequentially transmitted to the corresponding base stations K as the vehicle passes through the communication areas. The packets received by the base stations K are transmitted to the control station S. The control station S combines the packets and restores the original data.

When the data to be transmitted is divided into packets in this way, the size of a packet should be set to an appropriate size so that transmission of a packet is completed during the vehicle stay in a communication area. However, the time of the vehicle stay in a communication area depends on the vehicle traveling speed as described above. Therefore, the present system estimates the time of the terminal station antenna stay in a communication area, more specifically, in a SOT shown in FIG. 2C by detecting a vehicle speed when the vehicle enters the communication area, and sets the length of a packet to be the longest as far as transmission of the packet can be completed during the terminal station antenna stay in the communication area as follows.

The bit string of original information (FIG. 3A) are divided into frames beforehand as shown in FIG. 3B. Each frame includes a head flag, a header, data, information for error control, and an end flag in this order as shown in FIG. 3C. The head flag comprises a bit pattern which indicates the head of the frame. The header includes a sender address, a destination address, control information for the frame and the like. The end flag comprises a bit pattern which indicates the end of the frame. Each frame has a fixed length.

Figure 4A:
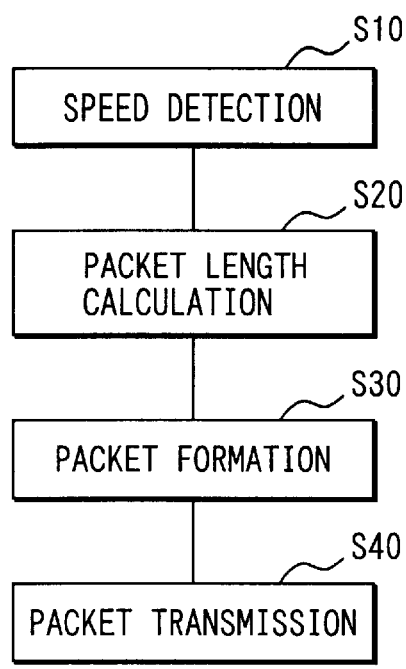
FIG. 4A is a flowchart of a first method for transmitting a packet of an appropriate length according to the vehicle traveling speed.

The length of a packet can be adjusted by varying the number of frames included in the packet. More specifically, as shown in FIG. 4A, the vehicle traveling speed is detected at step S10 first. The time of the vehicle stay in the communication area is calculated based on the detected speed, and the appropriate length of a packet is calculated based on the calculated time of the vehicle stay at step S20. Further, the number of frames included in the packet is calculated based on the calculated length of the packet, and the packet is formed by the calculated number of frames at step S30. The formed packet is transmitted at step S40.

This procedure is performed in each communication area, and the processes at steps S10–S30 are performed while the vehicle is in the SNT of the communication area before the SOT of the communication area. Thus a packet of different length is used in each communication area. For example, a packet of length La which includes Fa frames is used in the communication area a, a packet of length Lb which includes Fb frames is used in the communication area b, and a packet of length Lc which includes Fb frames is used in the communication area c as shown in FIG. 3D.

A packet of the appropriate length for each communication area may be prepared by selecting from the packets of various lengths which are formed and stored beforehand as follows, in contrast to the procedure shown in FIG. 4A in which a packet is formed in real time.

Figure 4B:
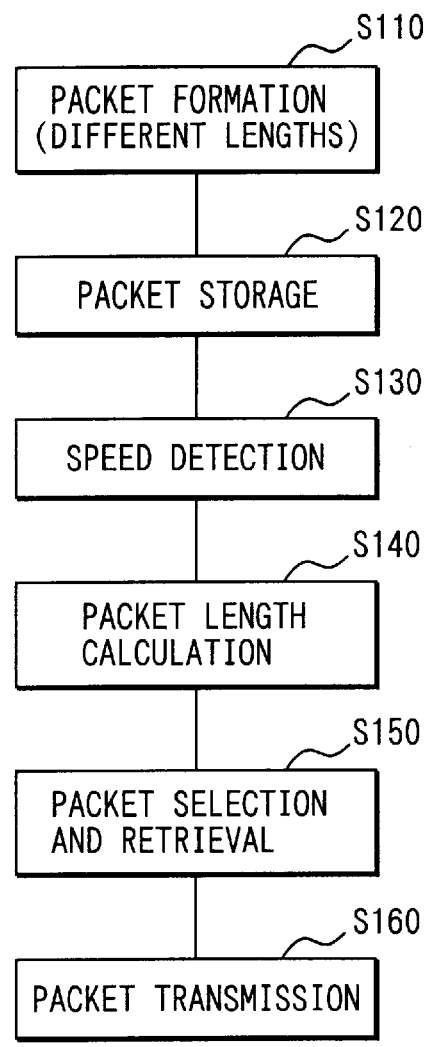
FIG. 4B is a flowchart of a second method for transmitting a packet of an appropriate length according to the vehicle traveling speed.

Referring to FIG. 4B, a plurality of packets which have different length (different number of frames) each are formed at step S110. For example, five kinds of packets, which include a packet of 10 frames, a packet of 20 frames, a packet of 30 frames, a packet of 40 frames, and a packet of 50 frames, are formed, and they are stored in a storage memory at step S120. Thereafter the vehicle traveling speed is detected at step S130. The time of the vehicle stay in the communication area is calculated based on the detected vehicle speed, and the length of a packet is calculated based on the calculated time of the vehicle stay at step S140. At step S150, the appropriate packet is selected from the packets stored at step S120 based on the calculated length, and the selected packet is retrieved from the storage memory. The appropriate packet means the longest packet among the packets which have lengths equal to or shorter than the calculated length. For example, if the calculated length is 49 frames, the stored packet of 40 frames is selected and retrieved at step S150. The retrieved packet is transmitted at step S160.

The procedure shown in FIG. 4B requires a relatively large amount of memory for storing the packets of various lengths, but transmission of the packet can be started earlier because the processes at steps S140, S150 are relatively simple. In contrast to this, the procedure shown in FIG. 4A takes relatively much time before transmission of the packet is started, but requires only a small memory. Furthermore, the procedure shown in FIG. 4A can form a packet which has a more appropriate length. For example, if the calculated length of a packet is 49 frames, the packet of 49 frames is formed in real time, in contrast to the procedure in FIG. 4B in which the packet of 40 frames is selected. Therefore, the procedure shown in FIG. 4A is more desirable for efficient data transmission.

Next six methods for detecting the vehicle traveling speed will be explained. One of them is a method which uses a speed sensor or GPS. The others are methods which utilize the present radio communication system between the base stations K and the terminal station T, and can detect the vehicle speed more accurately.

(First Method)

Figure 5A:
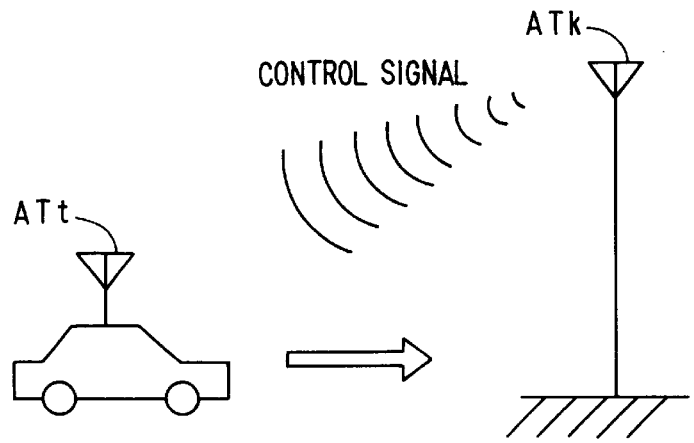
FIGS. 5A and 5B are schematic diagrams showing a first method and devices for detecting the vehicle traveling speed.
Figure 5B:
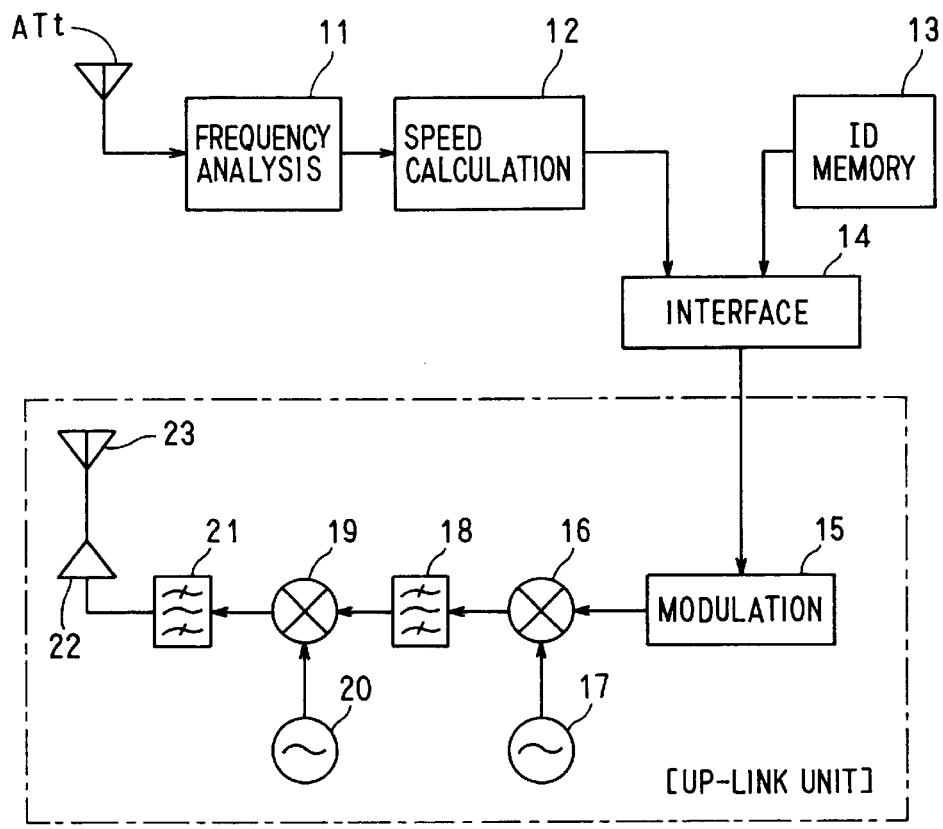

Referring to FIG. 5A, the base station K continuously transmits a control signal, which is a radio signal of a predetermined frequency, toward the terminal station T via the base station antenna ATk. Referring to FIG. 5B, the terminal station T receives the control signal via the terminal station antenna ATt. In the terminal station T, a frequency analysis unit 11 analyzes the frequency of the received control signal, and a vehicle speed calculation unit 12 calculates the vehicle traveling speed based on the analyzed frequency. The received control signal has a frequency shifted from that of the transmitted control signal due to the Doppler effect. Accordingly, the vehicle speed calculation unit 12 can calculate the vehicle traveling speed based on the amount of the frequency shift.

On the other hand, ID information that represents the terminal station ID is stored in an ID information memory 13. The vehicle traveling speed calculated by the calculation unit 12 and the ID information retrieved from the ID information memory 13 are transmitted to an up-link unit via an interface 14.

The up-link unit includes a modulator 15, a first mixer 16, a first local oscillator 17, a first bandpass filter 18, a second mixer 19, a second local oscillator 20, a second bandpass filter 21, an amplifier 22, and a transmitter antenna 23. The modulator 15 generates a modulating signal based on the vehicle traveling speed and the ID information received via the interface 14. The first local oscillator 17 generates a first local signal of an intermediate frequency (IF). The first mixer 16 mixes the modulating signal from the modulator 15 and the first local signal from the first local oscillator 17, that is, modulates the first local signal by the modulating signal into an intermediate IF signal. The first bandpass filter 18 removes the predetermined frequency component from the IF signal generated by the first mixer 16. The second local oscillator 20 generates a second local signal of a radio frequency (RF). The second mixer 19 mixes the IF signal received from the first bans-pass filter 18 with the second local signal, that is, up-converts the IF signal to a RF signal. The second bandpass filter 21 removes the predetermined frequency component from the RF signal generated by the second mixer 19. The amplifier 22 amplifies the RF signal from the second bandpass filter 21. The amplified signal is transmitted toward the base station K via the transmitter antenna 23. This up-link unit uses a predetermined up-link for transmitting the radio signal toward the base station K. However it may use another existing communication media such as a PDC system instead of the up-link line. Further, in the present communication system, a portion of the frequency band available in the communication area of the base station K may be assigned for uploading, and the up-link unit may transmit a radio signal to the base station K by using the assigned band for uploading. That is, the radio signal that represents the vehicle traveling speed may be transmitted from the terminal station T to the base station K by using the present communication system, and in this case, the terminal station antenna ATt may be used as the transmitter antenna 23.

The base station K demodulates the radio signal from the terminal station T and obtains the vehicle traveling speed and the ID information of the terminal station T. The obtained traveling speed is used for determining the length of a packet.

(Second Method)

According to the second method, the base station K transmits a radio signal of a predetermined reference bit rate and a predetermined reference frequency toward the terminal station T. The terminal station T receives the radio signal and analyzes the bit rate of the received radio signal. That is, according to the second method, the frequency analysis unit 11 in FIG. 5B is replaced with a bit rate analysis unit for analyzing the bit rate of a signal. The vehicle speed calculation unit 12 calculates the vehicle traveling speed based on the analyzed bit rate. The received radio signal has a bit rate shifted from that of the radio signal transmitted by the base station K due to the Doppler effect. Accordingly the vehicle speed calculation unit 12 can calculate the vehicle traveling speed based on the amount of the bit rate shift. The other components shown in FIG. 5B operate similarly to the first method.

In the first method, it is relatively difficult to obtain the amount of the frequency shift of the control signal accurately, because the frequency of the control signal generated by an oscillator has a tendency to be distorted. In contrast to this, the amount of the bit rate shift of the control signal can be obtained accurately, and therefore the second method can detects the traveling speed more accurately than the first method can.

(Third Method)

According to the third method, the terminal station T transmits a radio signal to the base station K, and the base station K detects the vehicle speed based on the received radio signal, in contrast to the first or second method.

Figure 6A:
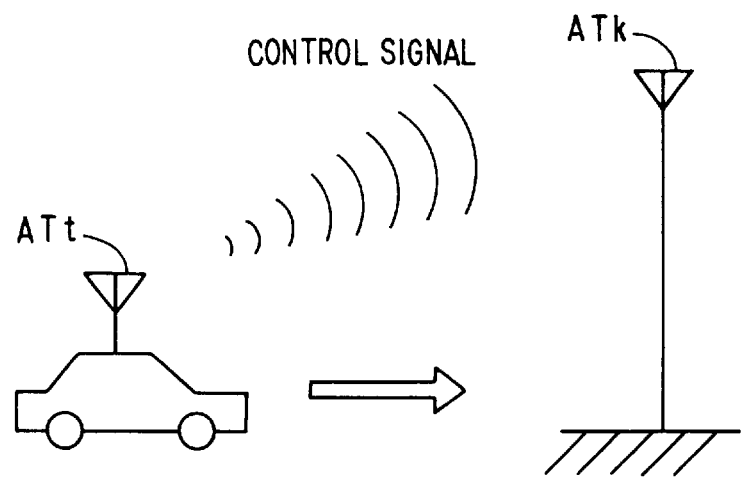
FIGS. 6A and 6B are schematic diagrams showing a third method and devices for detecting the vehicle traveling speed.
Figure 6B:
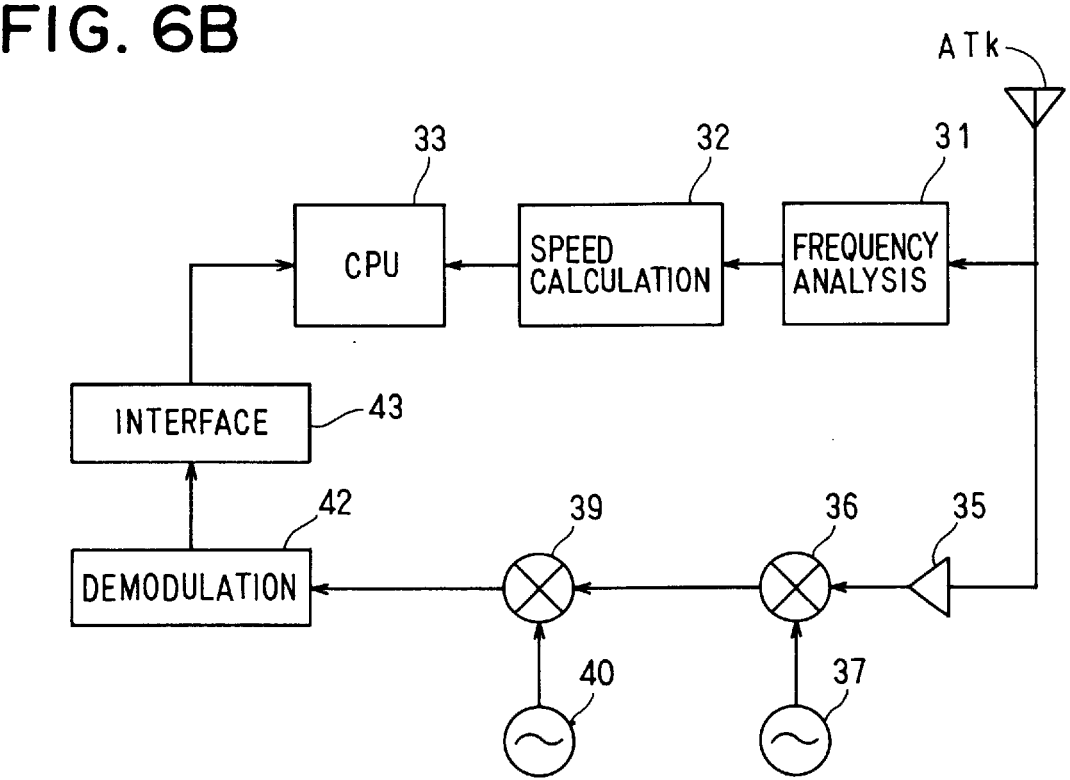

Referring to FIG. 6A, the terminal station T continuously transmits a control signal, which is a radio signal of a predetermined frequency, toward the base station K via the terminal station antenna ATt. The control signal is generated by modulating ID information, which represents the terminal station ID, by the predetermined modulation technique. Referring to FIG. 6B, the base station K receives the control signal via base station antenna ATk, and the received control signal is transmitted to a first down-converter 36 via an amplifier 35. The received control signal is also transmitted to a frequency analysis unit 31 in the base station K. The frequency analysis unit 31 analyzes the frequency of the received control signal. A vehicle speed calculation unit 32 calculates the vehicle traveling speed based on the analyzed frequency. The received control signal has a frequency shifted from that of the control signal transmitted by the terminal station T due to the Doppler effect. Accordingly the vehicle speed calculation unit 32 can calculate the vehicle traveling speed based on the amount of the frequency shift. The calculated traveling speed is transmitted to a CPU 33.

On the other hand, the first down-converter 36 extracts an IF signal from the received control signal by using a local signal of a radio frequency generated by a first local oscillator 37. The extracted IF signal is forwarded to a second down-converter 39. The second down-converter 39 extracts a base band signal by using a local signal of an intermediate frequency generated by a second local oscillator 40. The extracted base band signal is forwarded to a demodulator 42. The demodulator 42 extracts the ID information by demodulating the base band signal, and transmits the extracted ID information to the CPU 33 via an interface 43.

In this way, the base station K can obtain the vehicle traveling speed and the ID information of the terminal station T.

(Fourth Method)

According to the fourth method, the terminal station T transmits a radio signal of a predetermined reference bit rate and a predetermined reference frequency toward the base station K. The base station K receives the radio signal via the base station antenna ATk. According to the fourth method, the frequency analysis unit 31 in FIG. 6B is replaced with a bit rate analysis unit (not shown) for analyzing the bit rate of a signal. That is, the received radio signal is forwarded to the first down-converter 36 via the amplifier 35 and to the bit rate analysis unit. The bit rate analysis unit analyzes the bit rate of the received control signal. A vehicle speed calculation unit 32 calculates the vehicle traveling speed based on the analyzed bit rate. The received control signal has a bit rate shifted from that of the control signal transmitted by the terminal station T. Accordingly the vehicle speed calculation unit can calculate the vehicle traveling speed based on the amount of the bit rate shift. This method operates similarly to the third method. The fourth method can detect the vehicle traveling speed more accurately than the third method can for the same reason as the second method.

In the first and second methods, two-way communication between the base station K and the terminal station T is required to be performed for detecting the vehicle speed. In contrast to this, only one-way communication from the base station K to the terminal station T is required to be performed in the third and fourth methods.

(Fifth Method)

Figure 7A:
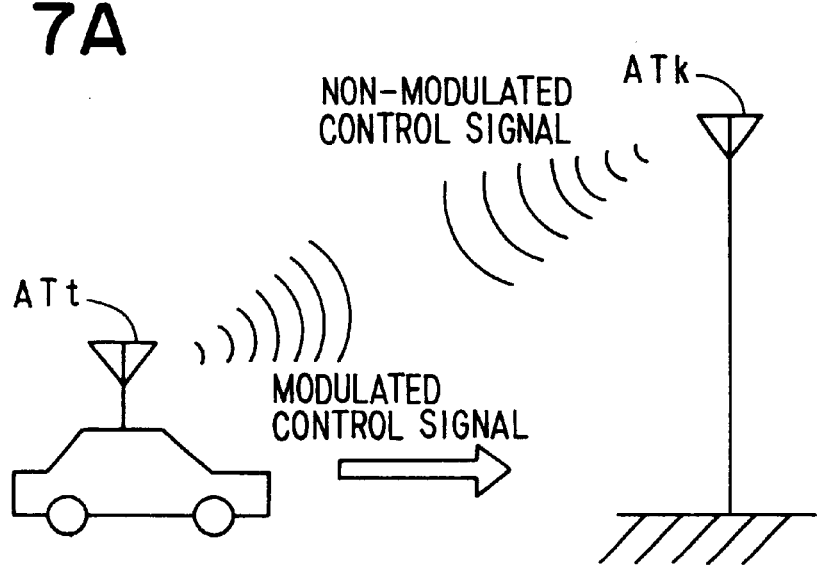
FIGS. 7A and 7B are schematic diagrams showing a fifth method and devices for detecting the vehicle traveling speed.
Figure 7B:
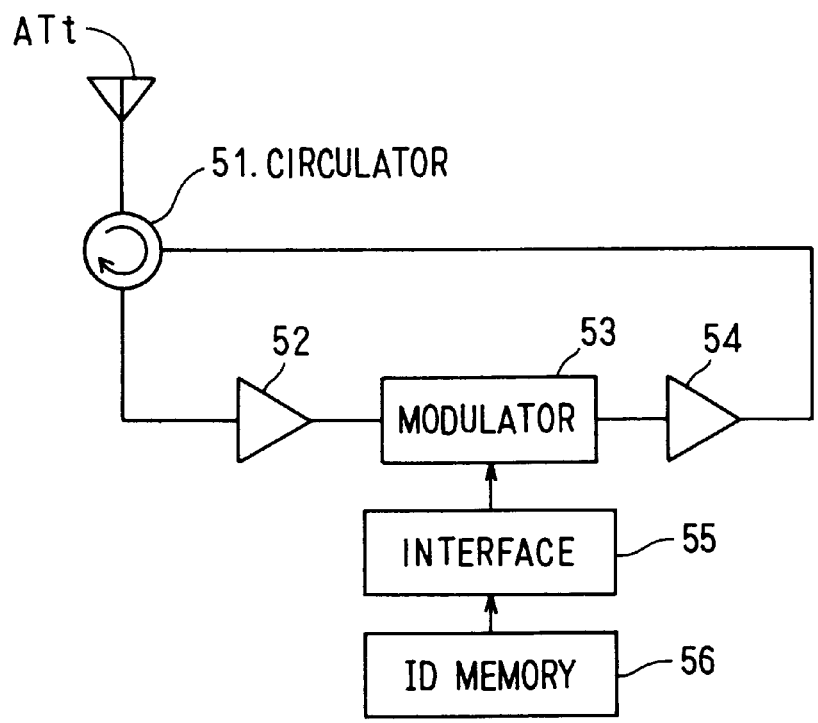

According to a fifth method, referring to FIG. 7A, the base station K continuously transmits a control signal, which is a non-modulated radio signal of a predetermined frequency, toward the terminal station T via the base station antenna ATk. Referring to FIG. 7B, the terminal station T receives the control signal via the terminal station antenna ATt. The received control signal is forwarded to a modulator 53 via a circulator 51 and a first amplifier 52. On the other hand, an ID information memory 56 stores ID information which represents the terminal station ID. The ID information is retrieved from the ID information memory 56, and forwarded to the modulator 53 via an interface 55. The modulator 53 modulates the received non-modulated control signal by the ID information. The modulated control signal is amplified by a second amplifier 54, and thereafter transmitted toward the base station K via the circulator 51 and the terminal station antenna ATt.

The modulated radio signal transmitted by the terminal station T has a frequency shifted from that of the non-modulated radio signal transmitted to the terminal station T. In the base station K, the frequency of the received modulated control signal is analyzed, and the vehicle traveling speed is calculated based on the frequency shift by similar components and in a similar way to the third method.

In the above four (first to fourth) methods, the reference frequency of a radio signal is predetermined beforehand. However, a radio signal transmitted by the base station K or the terminal station T often has frequency errors, and thereby the precision of detection of the vehicle traveling speed is lowered. In contrast to this, in the fifth method, the radio signal received by the base station K is a signal which is originally transmitted by the base station K. Therefore, if the vehicle speed is zero, the frequency of the radio signal received by the base station K fully accords with that of the radio signal transmitted by the base station K. Accordingly the radio signal transmitted by the base station K does not involve the frequency errors found in the above four methods.

(Sixth Method)

Figure 8:
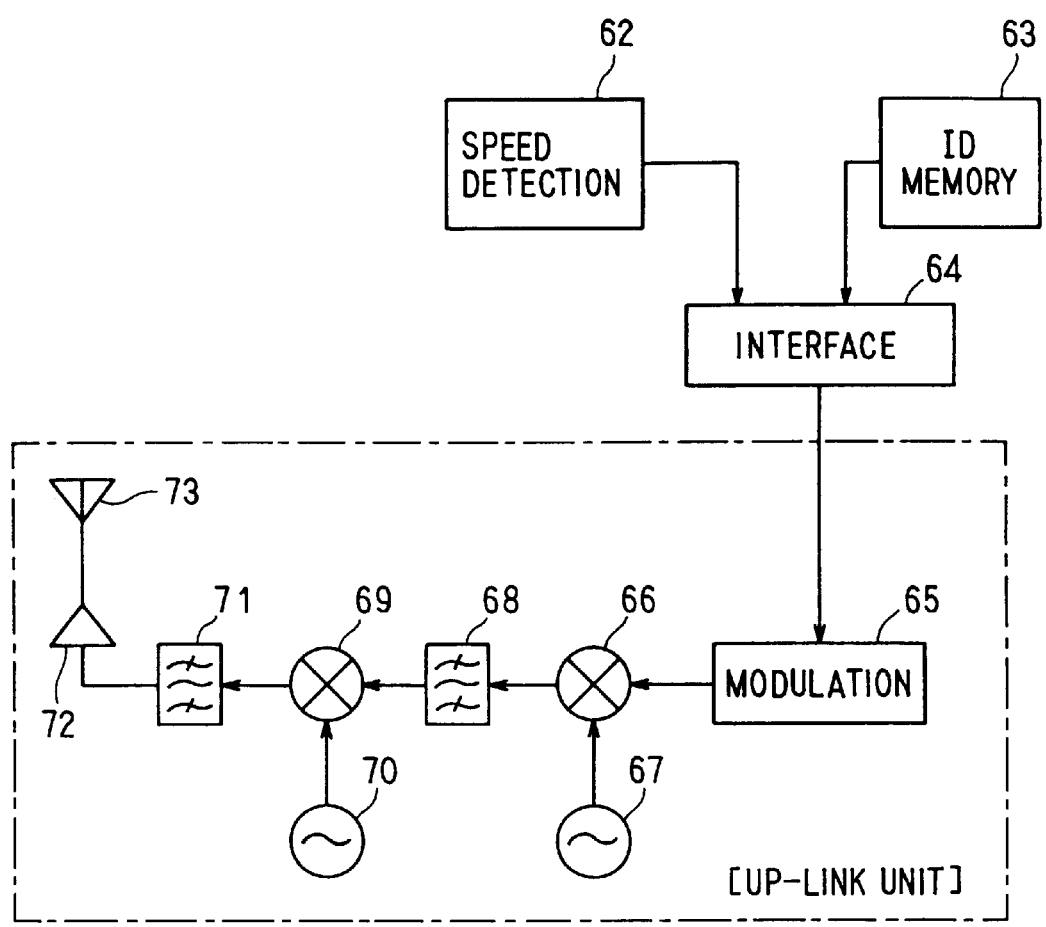
FIG. 8 is a schematic diagram showing devices for detecting the vehicle traveling speed by a sixth method.

Referring to FIG. 8, the sixth method detects the vehicle traveling speed by utilizing a speed sensor or a GPS unit 62 installed on a vehicle, and retrieves ID information from ID information memory 63 in the terminal station T. The detected vehicle speed and the retrieved ID information are forwarded to an up-link unit via an interface 64. The up-link unit modulates the vehicle traveling speed and the ID information by the predetermined modulation technique into a radio signal of a predetermined frequency, and transmits the radio signal toward the base station K. The up-link unit includes similar components to the up-link unit of the first method shown in FIG. 5B. The base station K extracts the vehicle traveling speed and the ID information by demodulating the radio signal received from the terminal station T. The extracted vehicle traveling speed is used for determining the length of a packet signal.

If broadband data transmission is possible in each communication area, the terminal station T can continuously use data that is intermittently received from the base station K when it includes a sufficiently large buffer memory. That is, a user in the vehicle can watch an animation such as stream video or stream radio delivered via the Internet. Further the user can download or upload real time image or voice. In this case, 'real time' does not mean exactly real time, but a delay of a certain extent is allowed similarly to real-time ground-based broadcasting. The live ground-based broadcasting has a delay of several seconds, and this delay is used for jamming inappropriate expressions.

The data intermittently received can be continuously used in the terminal station T if the terminal station T includes a sufficiently large buffer memory and the density of the communication areas is appropriate as described above. The appropriate quantity of the buffer memory and the appropriate density of the communication areas are discussed in detail in Japanese patent application No. 2000-72387 (U.S. patent application Ser. No. 09/804,475) which is incorporated herein by reference.

In the case that data is divided and transmitted, in addition to establishing the communication areas with the least possible number as far as the present system is superior to the continuous access method, it is effective to employ the combined radio-on-fiber (ROF) technology for communication between the control station S and the base station K for reducing infrastructure cost. If the combined ROF technology is employed, one control station S can control a plurality of base stations K collectively, and each base station K may function simply as an outlet for radio waves. Accordingly the infrastructure cost can be reduced.

The combined ROF technology may be employed in one of the following three ways. Uploading and downloading may be implemented by the same one way or two different ways of the three ways.

Figure 9A:
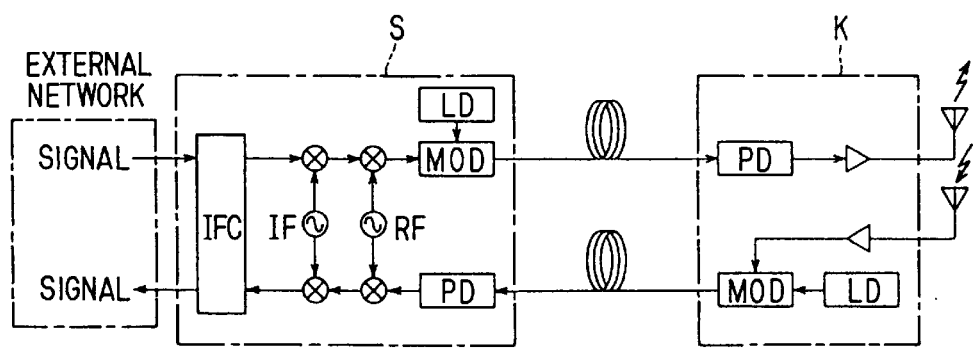
FIGS. 9A–9D are schematic diagrams showing devices for employing a combined radio-on-fiber (ROF) technology in the embodiment in three ways.

(i) RF signal transmission by ROF:

Referring to FIG. 9A, LD represents a laser light source, MOD represents an optical modulator which intensity-modulates an optical signal by an electric signal, and PD represents an opto-electric (O/E) converter such as a photo diode which extracts the electric signal from the intensity-modulated optical signal.

In the case of downloading data, a wire-carried signal received from an external communication network is processed for radio communication in the interface portion of the control station S and thereafter modulated into a base band signal. This base band signal is up-converted to an intermediate frequency (for example, 1 GHz) signal, and the IF signal is further up-converted to a high frequency (for example, 37 GHz or 60 GHz) signal. Then, a modulator (MOD) intensity-modulates light generated by a light source (LD) by the RF signal, and the modulated light signal is transmitted from the control station S toward the base station K through optical fiber link.

In the base station K, an O/E converter (PD) extracts the RF signal from the received light signal, and an RF amplifier amplifies the extracted RF signal. The amplified RF signal is transmitted toward the terminal station T via the base station antenna ATk On the other hand, in the case of uploading data, the base station K receives an RF signal from the terminal station T via the base station antenna ATk. In the base station K, a modulator (MOD) intensity-modulates light generated by a light source (LD) by the received RF signal, and the modulated light signal is transmitted to the control station S through optical fiber link. In the control station S, the O/E converter (PD) extracts the RF signal from the received light signal. The extracted RF signal is down-converted to an IF signal, and the IF signal is further down-converted to a base band signal. This base band signal is demodulated and converted to a wire-carried signal in the interface portion of the control station S, and the wire-carried signal is transmitted to the external communication network.

If this system, which transmits RF signals via optical fiber link, is employed, the structure of the base station K can be greatly simplified.

Figure 9B:
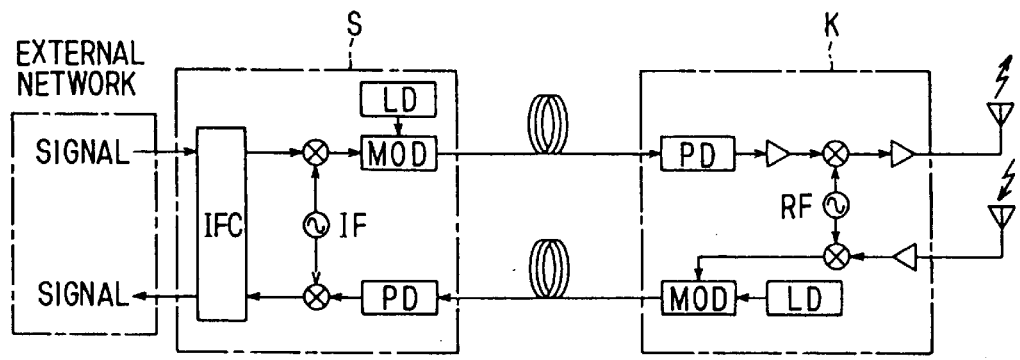

(ii) IF signal transmission by ROF:

Referring to FIG. 9B, in the case of downloading data, a wire-carried signal received from an external communication network is processed for radio communication in the interface portion of the control station S and thereafter modulated into a base band signal. This base band signal is up-converted to an IF signal. Then, a modulator (MOD) intensity-modulates light generated by a light source (LD) by the IF signal, and the modulated light signal is transmitted from the control station S toward the base station K through optical fiber link.

In the base station K, an O/E converter (PD) extracts the IF signal from the received light signal, and the extracted IF signal is up-converted to an RF signal. The RF signal is amplified by a RF amplifier. The amplified RF signal is transmitted toward the terminal station T via the base station antenna ATk On the other hand, in the case of uploading data, the base station K receives an RF signal from the terminal station T via the base station antenna ATk. In the base station K, the received RF signal is down-converted to an IF signal and a modulator (MOD) intensity-modulates light generated by a light source (LD) by the IF signal. The modulated light signal is transmitted to the control station S through optical fiber link. In the control station S, O/E converter (PD) extracts the IF signal from the light signal. The extracted IF signal is down-converted to a base band signal. This base band signal is demodulated and converted to a wire-carried signal in the interface portion of the control station S, and the wire-carried signal is transmitted to the external communication network.

If this system, which transmits IF signals via optical fiber link, is employed, inexpensive modulators may be used as the optical modulators since the optical modulators are not required to modulate light by an RF signal but they are only required to modulate light by an IF signal. Thereby, the total cost can be reduced.

Figure 9C:
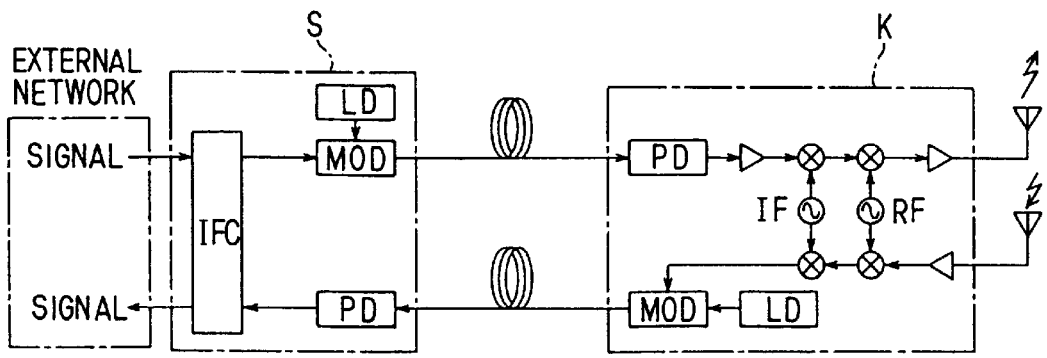

(iii) Base band signal transmission by ROF:

Referring to FIG. 9C, in the case of downloading data, a wire-carried signal transmitted from an external communication network is processed for radio communication in the interface portion of the control station S and thereafter modulated into a base band signal. A modulator (MOD) intensity-modulates light generated by a light source (LD) by the base band signal, and the modulated light signal is transmitted toward the base station K through optical fiber link.

In the base station K, an O/E converter (PD) extracts the base band signal from the received light signal. The extracted base band signal is up-converted to an IF signal, and the IF signal is further up-converted to an RF signal. The RF signal is amplified by a RF amplifier. The amplified RF signal is transmitted toward the terminal station T via the base station antenna ATk On the other hand, in the case of uploading data, the base station K receives an RF signal from the terminal station T via the base station antenna ATk. In the base station K, the received RF signal is down-converted to an IF signal and the IF signal is further down-converted to a base band signal. The modulator (MOD) intensity-modulates light generated by a light source (LD) by the base band signal. The modulated light signal is transmitted to the control station S through optical fiber link. In the control station S, the O/E converter (PD) extracts the base band signal from the light signal. The extracted base band signal is demodulated and converted to a wire-carried signal in the interface portion of the control station S, and the wire-carried signal is transmitted to the external communication network.

Figure 9D:
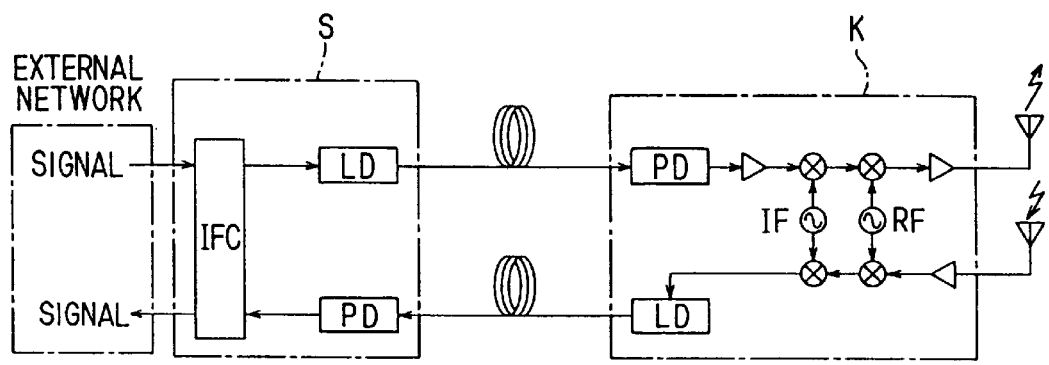

If this system, which transmits base band signals via optical fiber link, is employed, inexpensive modulators may be used as the optical modulators since the optical modulators are only required to modulate light by a base band signal. Thereby, the total cost can be reduced. Furthermore, referring to FIG. 9D, modulation by a base band signal may be implemented without the optical modulators (MOD) by employing laser light sources (LD) with modulation function.

In the present system, since the communication area is relatively narrow, that is, the time of the vehicle stay in the communication area is short, it is required to accurately estimate the available time for data transmission. Therefore the above methods except the sixth method are desirable.

(Other Embodiments)

(1) In the above embodiment, the length of a packet is adjusted by varying the number of frames included in the packet. However, it may be adjusted by varying the length of a frame. If error correction procedure is employed, process for the error correction is required to be performed for each frame. In the case that the length of a packet is adjusted by varying the number of frames, the length of a frame should be fixed to be as short as possible. Therefore, the number of frames to be transmitted is increased and, as a result, processing for error correction is increased. Then a high-speed arithmetic unit is required for error correction, and data transmission is delayed without the high-speed arithmetic unit. In contrast to this, in the case that the length of a packet is adjusted by varying the length of a frame, data transmission is not delayed if the high-speed arithmetic unit is not provided. Therefore it is more desirable to adjust the length of a packet by varying the length of a frame for efficient data transmission. However, if the length of a frame is fixed and the length of a packet is adjusted by varying the number of frames included in the packet, an access method which uses time slot (e.g., slotted ALOHA) can be employed so that the throughput of the communication system is improved. The length of a packet may be adjusted by varying both the number of frames included in the packet and the length of a frame.

(2) In the above embodiment, the vehicle traveling speed is detected by transmitting radio signals between a base station K and a terminal station T during the vehicle stay in the SNT of the communication area before the SOT. Thereby, a packet which has an appropriate length can be transmitted in each communication area according to the vehicle traveling speed.

In the case that a data communication zone in which the base station antennas ATk are installed densely and data is transmitted intensively is established, the vehicle traveling speed may be assumed to be constant in the data communication zone. In this case, the vehicle traveling speed is detected in a communication area which the vehicle enters first in the data communication zone, and it is not required to be detected in the other communication areas through which the vehicle travels while the vehicle is in the data communication zone.

Figure 10A:
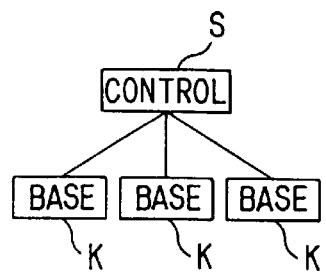
FIGS. 10A and 10B are schematic diagrams showing bus network structures for connecting base stations to a control station.
Figure 10B:
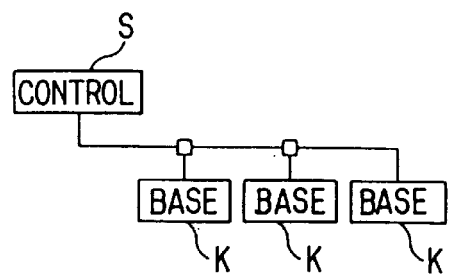

(3) In the above embodiment, a plurality of base stations K are connected to a control terminal S so that a tree network is formed as shown in FIG. 10A. However, the base stations K may be connected to the control terminal S serially so that a linear network is formed as shown in FIG. 10B. In this case, optical communication should be employed as described above, and optical carrier waves transmitted to each base station K should have a different wavelength. This is implemented by wavelength division multiplexing (WDM). In contrast to this, in the case of a tree network shown in FIG. 10A, optical carrier waves transmitted to each base station K may have the same wavelength. However, the number of the optical fiber systems is increased and thereby infrastructure cost is significantly increased. In contrast to this, in the case of a linear network shown in FIG. 10B, only one optical fiber system is required.

(4) In the above embodiment, the present radio communication system is employed for communication between a vehicle and a roadside. However, a mobile object may be other than a vehicle. If the mobile object travels along some passage like a vehicle travels along a road and the passage comprises a plurality of lanes like the road comprises a plurality of traffic lanes, the present system may be employed for communication between a terminal station installed on the mobile object and base stations provided along the passage.

Furthermore, in the above embodiment, the present system is employed for a radio communication system which uses the spot access method because broadband data transmission is possible in each communication area and the available time for data transmission in each communication area is clear in the spot access method. However, the present system may be employed for a radio communication system which uses another access method.

(5) In the above embodiment, the detected vehicle traveling speed is used for efficient data transmission. However, it may be used for another purpose. For example, the detected vehicle speed may be provided for a traffic center as traffic information.

The present invention should not be limited to the above embodiment and its modifications, but may be implemented in many other ways without departing from the spirit of the invention.

What is claimed is:

1. A radio communication system comprising a terminal station installed on a mobile object and a plurality of base stations provided along a traveling route of the mobile object, each of the base stations forming a limited communication area and performing radio communication with the terminal station which is in the corresponding communication area, wherein if data transmission between a base station and a terminal station cannot be completed in one communication area corresponding to the base station, data is divided and transmitted in a plurality of communication areas corresponding to base stations arranged in a traveling direction of the mobile object, and wherein a mobile object traveling speed is detected, and data transmission is performed using a packet of an appropriate length according to the detected mobile object traveling speed.

2. A radio communication system as set forth in claim 1, wherein the packet includes at least one frame, and a length of the packet can be adjusted by varying a number of frames included in the packet.

3. A radio communication system as set forth in claim 1, wherein the packet includes at least one frame, and a length of the packet can be adjusted by varying a length of a frame.

4. A radio communication system as set forth in claim 1, wherein a packet of an appropriate length is formed in real time according to the detected traveling speed of the mobile object, and the packet is transmitted.

5. A radio communication system as set forth in claim 1, wherein a plurality of packets of different lengths are formed beforehand, and wherein a packet of an appropriate length is selected from the formed packets of different lengths, and the selected packet is transmitted.

6. A radio communication system as set forth in claim 1, wherein the base station obtains a mobile object traveling speed by using one of the methods as set forth in claims 1 to 6 when data is divided and transmitted in a plurality of communication areas corresponding to base stations arranged in the traveling direction of the mobile object.

7. A radio communication system as set forth in claim 1, wherein the terminal station obtains a mobile object traveling speed by using one of the methods as set forth in claims 1, 2, and 6 when data is divided and transmitted in a plurality of communication areas corresponding to base stations arranged in the traveling direction of the mobile object.

8. A radio communication system as set forth in claim 1, wherein the communication area formed by each of the base stations is sized not to include a plurality of terminal stations simultaneously, and wherein the communication areas formed by the base stations are configured not to overlap each other.

9. A radio communication system as set forth in claim 8, wherein each of the communication areas is a largest size as far as it cannot include a plurality of terminal stations simultaneously.

* * * * *